Figure 1:
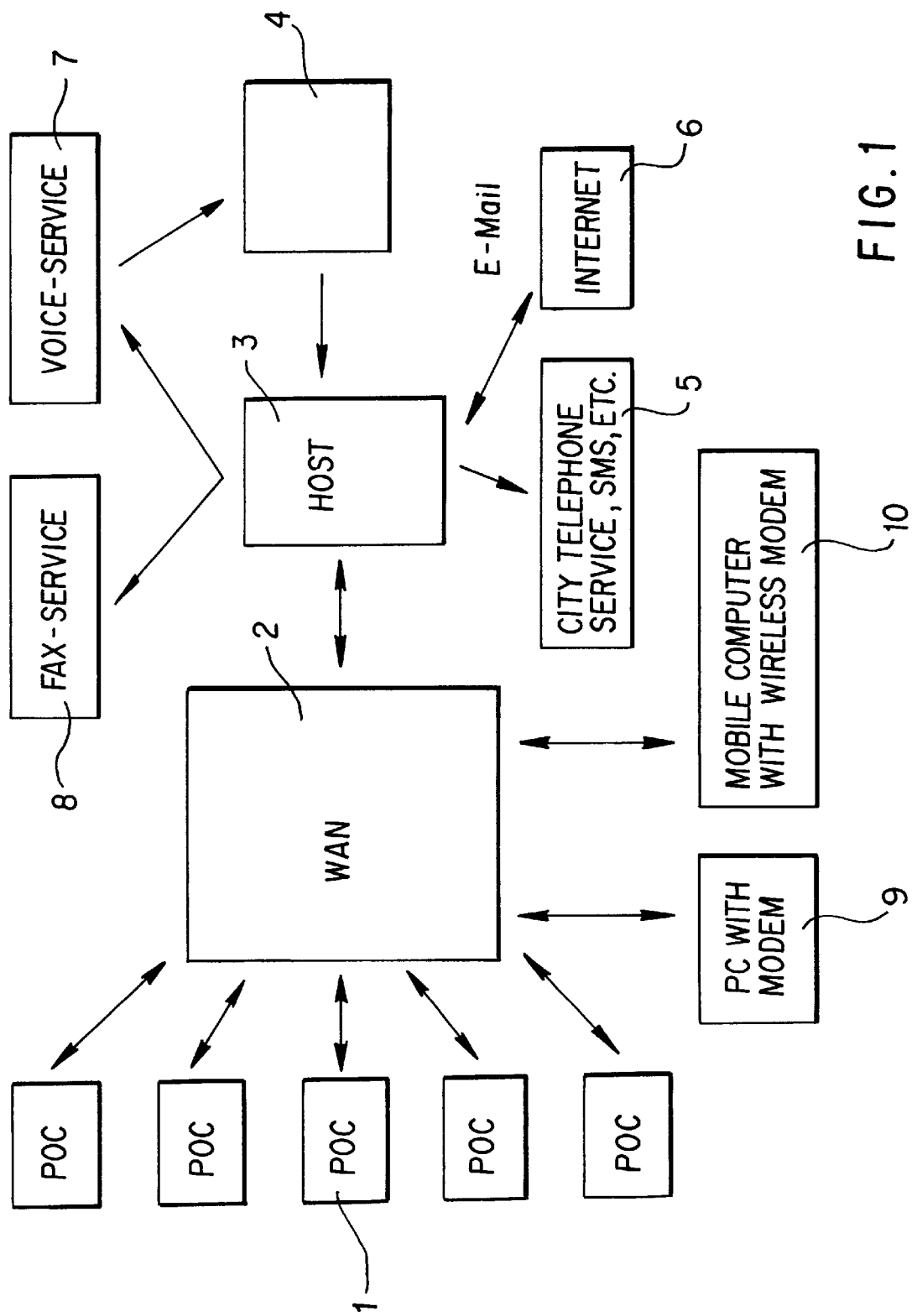

United States Patent [19]
Schneider

[11] Patent Number: 6,023,498
[45] Date of Patent: Feb. 8, 2000

[54] PROCESS FOR DATA COMMUNICATIONS AND A DATA COMMUNICATIONS SYSTEM FOR CARRYING OUT THE PROCESS

[76] Inventor: Bernd Schneider, Am Zschoner Berg 2, D-01462 Ockerwitz, Germany

[21] Appl. No.: 09/142,523
[22] PCT Filed: Mar. 12, 1997
[86] PCT No.: PCT/DE97/00485
§ 371 Date: Jan. 27, 1999
§ 102(e) Date: Jan. 27, 1999
[87] PCT Pub. No.: WO97/35398
PCT Pub. Date: Sep. 25, 1997

[30] Foreign Application Priority Data

Mar. 12, 1996 [DE] Germany .......................... 196 09 556

[51] Int. Cl.[7] .................................................. H04M 11/00
[52] U.S. Cl. ...................................................... 379/93.02
[58] Field of Search .......................... 379/93.01–93.08, 379/93.14, 93.24–93.32, 93.37, 100.01, 100.02, 90.01, 110.01

[56] References Cited

U.S. PATENT DOCUMENTS 4,694,492  9/1987  Wirstrom et al. ..................... 379/93.02
5,406,619  4/1995  Akhteruzzaman et al. ......... 379/93.02

FOREIGN PATENT DOCUMENTS 0143766  6/1985  European Pat. Off. .
0491639  6/1992  European Pat. Off. .
2640782  6/1990  France .
29515737  2/1996  Germany .
WO94/12954  6/1994  WIPO .

*Primary Examiner*—Wing F. Chan
*Attorney, Agent, or Firm*—Jordan and Hamburg LLP

[57] ABSTRACT

A process for data communications whereby an acquisition device is used to gather information data through a transmitter-user, these data then being provided with appropriate address data and made available to an authorized receiver-user in a host computer for issuing the same. A data communications system comprising a transportable data carrier, a data acquisition device for collecting and storing data on the data carrier, a data read-out device for reading the data carrier and a data output device. During a configuration operation preceding data communication, a transportable data carrier is provided with data carrier-specific and/or user-specific identification data. The transportable data carrier is used at least by the receiver-user in such a way that these identification data are read out from the data carrier to determine authorization. Where there is agreement, at least one reception signal is issued to the receiver-user to characterize available information data. A number of spatially separated communications devices are provided and contain at least the data read device and the data output device. These communications devices are provided with a link, via a leased line, selectable telephone line or radio data line, to a host computer. Non-alterable data carrier-specific identifying data are stored on said data carrier. User-specific identification data and input-capable receiver-specific address data and information data can be stored via the data acquisition device.

13 Claims, 2 Drawing Sheets

PROCESS FOR DATA COMMUNICATIONS AND A DATA COMMUNICATIONS SYSTEM FOR CARRYING OUT THE PROCESS

The invention relates to a data communication method, for which, by means of data acquisition equipment, informational data is acquired by a sender user and, provided with the appropriate address data, made available to an authorized recipient user in a host computer for output of the data, a comparison being made between the identification data and the address data for the purpose of establishing authorization. At the same time, during a configuration preceding the date configuration, a portable data carrier is provided with data carrier-specific and/or user-specific identification data and is used at least by the user receiver in such a manner, that this identification is read from the data carrier to determine authorization. In the event that there is agreement, at least one receiving signal is put out to the recipient user in order to characterize the information data present.

The invention furthermore relates to a data communication system with a portable data carrier, a data-acquisition device for acquiring and storing data on data carriers, a data reader for reading the data carrier and a data output device and with several communication devices, which are separated from one another spatially, contain at least the data reader and have a connection to a host computer over a leased line, a discretionary telephone line or a data radio line.

The exchange of data between two or more computers by means of portable data carriers, such as diskettes, is known. For this, it is always necessary to ship the data carriers physically. Any information, stored on a data carrier, reaches the recipient only if the latter received the data carrier and subsequently reads the stored data. Such an exchange of data is very time consuming and relatively unreliable. Moreover, an unauthorized recipient immediately is in possession of all the data transmitted. Even if this data is encrypted, the unauthorized recipient has sufficient time to decode the data.

In recent times, communication systems have been developed, which avoid shipping the data carriers physically. These include especially data networks.

When such a data network is used, informational data, which is to be sent by a sender user to a recipient user of the data network, is acquired by means of an acquisition device, for which generally a computer is used. So that it reaches the recipient, the informational data is provided with the appropriate address data. This informational data is then sent to a host computer, to which both users have access.

In this host computer or in an associated storage medium, the informational data is made available for output to an authorized recipient user. To determine authorization, a comparison is made between identification data and address data.

Since it is not to be anticipated that both users will have access to the host computer at the same time, the information is filed for a specific recipient in so-called mailboxes.

In general, however, access to such networks is possible only with relatively expensive hardware. Although users, who have to handle computers with an appropriate hardware configuration anyhow, like to use these means of communication, the purchase of appropriate hardware merely for the purpose of participating in modern data communication, represents an obstacle for numerous users. Moreover, the use of corresponding data communication software and hardware requires some knowledge, which large groups of users may not have.

Accordingly, the advantageous possibility of being able to download information at the desired time and not have to be ready to receive such information at all times is available only for a small group of users.

Telephone answering machines or electronic phone mailboxes represent one possibility available to a wide circle of users of receiving news independently of time. However, these show the disadvantage of a psychological inhibiting threshold, which can be noted frequently, since the user is confronted directly with the fact of speaking his news in a brief and concise form and no longer has any possibilities of making corrections. Moreover, uploading such news remains limited to a verbal communication.

Since the existing possibilities for uploading and downloading news at a time desired by the recipient are utilized only very hesitantly for the reasons given above, the use of cellular telephones is increasing constantly. However, the large increase in the use of such telephones, which usually are kept in the answering mode, is associated with an increase in the electromagnetic radiation. In the future, assuming that such radiation is proven to be ecologically harmful, this can represent a problem that cannot be disregarded.

It is therefore an objective of the invention to provide an informational system and a method for the exchange of information, which makes modem exchange of data possible inexpensively with little expense for the technical operation and with which all information can be downloaded by the recipient at a desired time with great data security.

With regard to the method, this objective is accomplished owing to the fact that, during a configuration preceding the data communication, a portable data carrier is provided with data carrier-specific and/or user-specific identification data. This portable data carrier is used at least by the recipient user in such a manner, that this identification data is read from the data carrier for establishing the authorization. In the event of agreement, at least one receiving signal to indicate the existence of informational data is put out to the recipient user.

With this method, it becomes possible to receive at any time by means of an identification at least one signal indicating whether information is waiting to be picked up by a recipient. Such signaling should be brought about with simple technical means, so that a user does not have to be equipped with relatively extensive hardware, in order to find out whether there is information for him. A user can pass on information only if her personally is authorized to do so. This is of importance for all those cases, for which the sending is associated with fees, which will be debited to the user.

Moreover, a sender user is able to send sender data only if an identificaiton entered agrees with stored personal identificaiton. By these means, it is possible for a recipient user to ensure that the information, which he finds with the appropriate sender data, also actually originated from the sender. If the data carrier is misused by a third party, perhaps after a loss by the user, at least the sending of wrong information can be prevented.

By means of this data communication system, it is, for example, also possible to combine the chip card with known check, credit or similar cards.

All functions presented can be realized with a chip card without making special demands on the chip. Accordingly, standard chips can be used, as a result of which the use is very cost effective for the user. Chip cards furthermore have the advantage that they can be handled very well.

In one embodiment of the inventive method, the receiving signal is forwarded over a separate transmission channel to the recipient user.

By these means, it can become possible that a user receives a brief signal that there is information for him, for example, by way of an RDS signal, a DAB signal, a video text signal or a different signal, which is coded specifically for the recipient. This can also be done over other signaling paths, such as a City-Ruf signal. The user is now in a position to download the information at the earliest convenient time.

In a different embodiment of the invention, provisions are made so that, when there is agreement, the informational data, together with information concerning the sender user, is put out to the recipient user.

In the case of this embodiment, a sender user is able to send the sender information only if there is agreement between the identification entered and a stored personal identification. By these means, a recipient user can ensure that the information, which he receives with the appropriate sender information, also actually originates from the sender. If the data carrier is misused by a third party, perhaps after a loss by the user, at least the sending of bogus information can be prevented.

An especially preferred embodiment of the invention is characterized in that informational data and address data, which are to be sent, are stored at one point on the portable data carrier and read at a later time from this data carrier for input into the host computer.

With that, the sender user is put in a position to acquire data independently of his location and of time. He can also have information prepared by a third party and send such information at a particular time. This information is stored on the data carrier and thus available to the user, who does not have to carry a compact device on his person.

In a further development, provisions are made that the portable data carrier is used in such a manner by the sender user that the identification data is read from the portable data carrier before informational and address data is downloaded to the host computer, and compared with authorization data, the downloaded data being released if there is agreement.

By means of such an embodiment, it is achieved that a user can pass on information only if he is personally entitled to do so. This is of importance for all those cases, for which the transmission is associated with fees, which will be charged to the user.

In a variation of the inventive method, the authorization data consists of an identification, which can be entered in such a manner that, before the comparison with the authorization data by the user, the identification is entered and compared with the personal identification stored on the portable data carrier.

In the case of this embodiment, the authorization is determined by the data carrier. Different authorization regions can also be preinstalled on the data carrier.

In a different variation of the inventive method, the authorization data is stored in the host computer.

The authorization is determined here in the host computer. It can also be changed centrally. In practice, a combination of both above-named embodiments will also prove to be advantageous.

It is particularly advantageous that, when sending informational data, after the identification of the sender user, which must be entered before sending, is found to be identical with the personal identification stored in the memory, the identification in the memory can be read from the memory as sender information of the sender user.

By means of such a variation, the sender information is entered automatically. With that, on the one hand, the operating convenience is increased, since the sender user need not enter his sender information. The recipient user, on the other hand, can assume with great assurance that the sender information is not falsified, since it is entered automatically.

An advantageous development of the inventive method is characterized in that, after agreement of an identification of the sender user, which must be entered before the sending, with the personal identification stored in the memory, the personal identification in the memory can be changed.

By these means, a user is put in a position of changing his personal identification, stored in memory, at intervals of time in order to increase data safety.

Furthermore, it is advantageous that, by means of the address data or an additional service identification, the informational data can be passed on to the recipient with the interposing of other networks.

By means of the special addressing or, advantageously, by means of a special service identification, other networks, such as a fax service or an e-mail service of providers of other networks can be reached, as a result of which the area of application of the inventive method is enlarged.

In a further, advantageous form of the inventive method, provisions are made so that fee information, corresponding to informational data transmitted, is generated by the host computer and stored on the portable data carrier.

If the fee value is set appropriately, information can be transmitted or read by such an embodiment of the method as long as permitted by the preset fee value, in much the same way as with a known phone card.

In a different advantageous form of the inventive method, an accounting identification is stored on the portable data carrier and fee information, corresponding to the informational data transmitted, is generated by the host computer. This fee information is passed on to a computer, corresponding to the accounting identification, for further processing.

With this form, it then becomes possible to debit a fee, arising during the communication, directly to the bank connection of the user. For using this form, it is particularly advantageous if the inventive method, corresponding to the representation given above, can be used only after a correct identification has been entered.

From a lay-out point of view, the object of the invention is accomplished owing to the fact that several communication facilities are provided, which are spatially separate and contain at least the data reader. These communication facilities have a connection over a leased line, a discretionary telephone line or a data radio line to host computer. Invariable, data carrier-specific identification data is stored on the data carrier. User-specific identification data, recipient-specific address data, which can be entered, as well as informational data, can be stored by way of the data acquisition equipment.

A plurality of network-like communication devices are provided by means of this data communication system and have the necessary connection to the host computer. With that, the user is freed from transporting such communication devices himself, even though he can also use personal communication devices, especially when these are connected to the host computer over a radio data connection. In the normal case, however, the central communication devices are used.

The simplest configuration of communication equipment can be seen therein that it contains only data reading equipment. With that, data can be read from the data carrier and passed on subsequently to the host computer. In this case, however, it is advisable to provide an indicator so that the user receives an optical or acoustic signal, when the data reading process is finished. It is also advantageous if the user receives a signal from such an indicator when there is information for him in the host computer.

If the communication equipment is supplemented by a data output device, data, which is made available for the user, can either be indicated at once or stored on the data carrier.

In the event that the communication device is equipped only with a reading device and/or data received is stored only on the data carrier, it is necessary that the data can be downloaded and read independently of the communication equipment. For this purpose, stationary or portable computers are available, especially pocket computers, which are provided with appropriate devices for reading the data carrier.

For different expansion steps of the communication equipment, it is advisable to store the software for reading data carriers or for writing on the data carriers at least with functionally important parts on the data carrier itself.

Due to the construction of the data communication system, it is possible that the user need only carry along the portable data carrier. He is therefore not required to purchase expensive hardware or an expensive installation, as a result of which a large number of users can obtain access.

Due to the ability to change recipient-specific address data and informational data, it becomes possible to offer preset data carriers from several manufacturers. These can then be individualized by the user himself, in that the identification data is adapted to his personal requirements.

With such an equipment configuration, informational data can be acquired, sent and also received. Accordingly, such a combination is given preference in the case of central communication equipment.

In a further advantageous development of the invention, provisions are made so that the host computer is provided with addressable connections to other networks.

In the case of such a form of the invention, the user can utilize networks of other network operators with his data carrier, without having to carry further hardware.

In a particularly preferred embodiment of the inventive data communication system, the data carrier is constructed as a chip card, which is provided with a write and read nv memory.

In this connection, it is also possible for the chip card to be combined with known check, credit or similar cards.

All the functions presented can be realized with a chip card, without having to subject the chip to special requirements. For example, standard chips can be used, as a result of which the use is very cost-effective for the user. Furthermore, chip cards have the advantage that they can be handled very well.

If a chip card is used as portable data carrier, it is advisable to provide a chip card reader, which can be attached to the data acquisition and/or data output equipment or integrated in this equipment.

Figure 2:
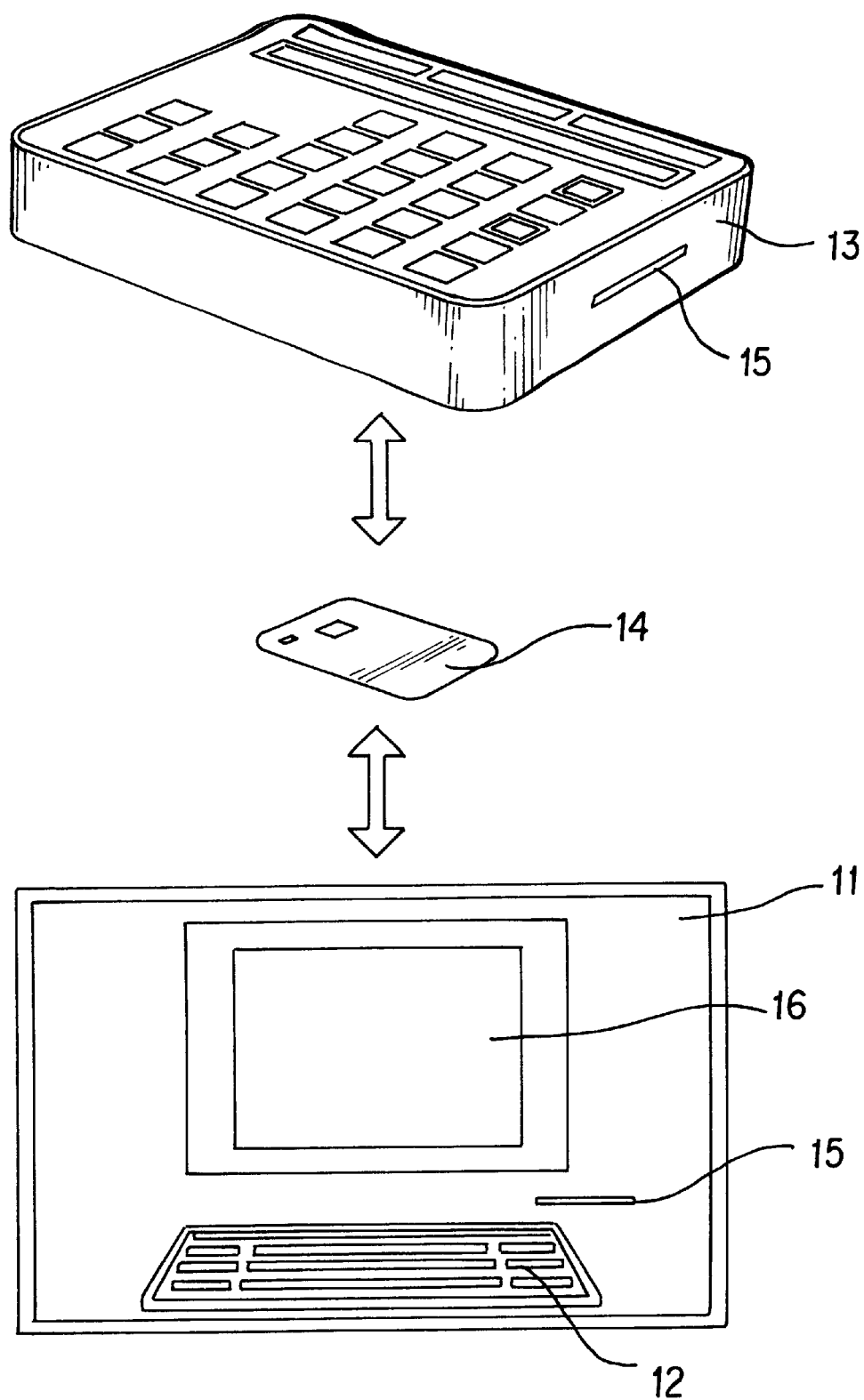

The invention will be described in greater detail in the following by means of an example. In the associated drawings, FIG. 1 shows a diagrammatic overview of an inventive data communication system and FIG. 2 shows a diagrammatic representation of an embodiment with a portable data acquisition and data display device.

Within a territory, several points of communication (POC) 1 are provided. Communication devices, which are not described in greater detail, are disposed within these points of communication. They are constructed as combined data acquisition and data output devices. A data acquisition device, a data reading device and a data output device are integrated in them.

The individual communication points are connected over a network 2 with a host computer 3. This host computer 3, in turn, has connections to further communication services 4, such as city telephone service 5, Internet 6 with attached e-mail service, voice services 7 or fax services 8.

Sender users, as well as recipient users, use chip cards as data carriers. These chip cards, on which a read and write nv memory is disposed, are not shown in greater detail.

A data carrier-specific identification is written into this memory. Before the first use, each user has individualized his chip card with his own person-specific identification.

For communicating between two users, the chip cards do not communicate directly with one another. Rather, a data file is downloaded by a stationary computer and stored on the chip card. This data file contains data, which are still to be specified during a trip of a user. When the final data is present, the user intends to pass on this relevant data, for example, to a supplier. With that, this user becomes a sender user. He will now go with his chip card to the nearest point of communication and there push his chip card with the (initially not yet actualized) data into the card reader of the communication device. Since the communication device is provided with a data acquisition device and a data output device, he can put the previous content of the data on screen. By means of the data acquisition device, he can then edit the data, and provide it with the address of his supplier.

For sending a data file, a data connection to the host computer 3 is established over the telephone network by the communication device at the point of communication 1. With that, the information is in the host computer now under the address of the supplier.

Since the supplier, that is, the recipient user, has to record very many inputs of such data during the day, he is connected with a personal computer 9 over a modem with the network 2 and, with that, the host computer 3. After the input of the data file 5 into the host computer, a signal acknowledging receipt is initiated by the PC 9, so that the receiver user is now informed of the input and can read the data.

In the same way as the recipient user is connected with his PC 9 to the network 2, further subscribers can be connected, for example, over a mobile computer 10 and a wireless modem with the network 2.

If a message is to be sent to a different user, who is not connected on-line with the network 2, the information is also filed once again address-related in the host computer 3. Provisions can be made for the address in question that a notification that a message has come into the host computer 3 can be sent to a city telephone service receiver of the recipient user. The latter thus is notified that new information is ready to be downloaded by him immediately upon receipt of the information in the host computer 3.

The receiver user will go to the closest point of communication 1. There he will push a chip card into the chip card reader. After that, the chip card-specific identification is read and compared with the addresses in the host computer 3. The information for the receiver user is determined. However, this is displaced only if the identification, which the user has to enter, agrees with the personal identification on the chip card. After that, the recipient can read the information or store it once again on his chip card for later processing.

The host computer provides fee information for the data transfer. By means of the accounting information stored on the chip card, the fees arising are debited immediately to the account of the user.

By means of this data communication system, every user is in a position to prepare information at any time and to send it to the recipient. The recipient himself can determine the time when he intends to receive the information.

One possible embodiment of the data communication system is shown in FIG. 2. In this system, the communication device 11 is provided at the point of communication 1 merely with a keyboard 12, which is used essentially for entering the identification but not for entering the informational data. A pocket computer 13 is used for collecting informational and address data. The transport of data between the pocket computer 13 and the communication equipment 11 is taken over by the chip card 14, which is constructed as data carrier. For reading and writing data, a chip card read and write device 15 is provided at the pocket computer 13 as well as the communication equipment.

Aside from the read and write nv memory, a ROM is disposed on the chip card 14. The software, which controls the read and write processes carried out with the chip card 14, is stored in this ROM. By means of this software, it is possible to realize that the read and write processes are carried out with the card only if the identification, entered by the user, agrees with the stored, personal identification.

The pocket computer 13 acquires the informational data and prepares the address, to which this informational data is to be sent, independently of any communication equipment 11. At the desired time, the user can now . . . a communication equipment 11 by pushing the chip card 14 into the chip card read and write device 13 at the communication equipment 11. By means of this process, the software, which is stored on the chip card 14 or in the communication device 11, carries out the comparison of the identification data and controls the read and write processes, is started.

Information, which is prepared using the pocket computer 13, is thus read and sent with the address data to the host computer 3, where it is made available to the addressee.

If there is information for the user himself, then this information is subsequently stored on the chip card 14.

Since the visual output of data in this example can take place over the pocket computer 13, it may not be necessary to display the informational data on the screen 16. The screen 16 is therefore used only for guiding the user through the menu and for indicating whether informational data is present and when the read and write processes are concluded and the chip card 14 can be removed. Consequently, the screen 16 can also be replaced by a simple optical or acoustic display of the individual functional states.

Of course, it is also possible to provide the keyboard 12 also for the input of data and to expand the display on the screen 16 by the possibility of displaying information. In that case, the communication equipment can also be used by persons, who do not have a mobile computer 10 or a pocket computer 13.

For the simplest configuration of the communication equipment 11, namely the realization of the automatic reading, the forwarding of informational data to the host computer and the automatic writing of informational data received on the chip card 14, such communication equipment is coupled with known ATM machines.

By means of such a combination, the services offered by banks can be expanded. For example, the additional possibility of the inventive data communication can be offered on credit cards.

On the other hand, the already existing ATM machines can be used not only for monetary transactions, but also for data communication. Since essential parts of the ATM machines, that is hardware parts, such as a chip card reader 15, a keyboard 12 or a screen 16 and software parts, such as read and write processes, PIN confirmations, etc. are already present in the same of a similar form, such ATM machines can be retrofitted with the additional function of data communication without a considerable expense.

In the case of different configurations, however, it is advisable for the user to have access to a separate data acquisition and display device, since he then can prepare and read the information without being interrupted.

DATA COMMUNICATION METHOD AND DATA COMMUNICATION SYSTEM FOR IMPLEMENTING THE METHOD

Reference Numbers 1 point of communication
2 network
3 host computer
4 communication service
5 city telephone service
6 Internet
7 voice service
8 fax service
9 personal computer
10 mobile computer
11 communication equipment
12 keyboard
13 pocket computer
14 chip card
15 chip card read and write device
16 screen

I claim:

1. A data communication method, for which, by means of data acquisition equipment, informational data is acquired by a sender user and, provided with the appropriate address data, made available to an authorized recipient user in a host computer for output of the data, a comparison being made between the identification data and the address data for the purpose of establishing authorization, during a configuration preceding the data configuration, a portable data carrier being provided with data carrier-specific and/or user-specific identification data, which is used at least by the recipient user in such a manner, that this identification is read from the data carrier to determine authorization and, in the event that there is agreement, at least one receiving signal is put out to the recipient user in order to characterize the informational data present, characterized in that a chip card with a read and write nv memory and a ROM memory are used as data carrier, that during the configuration at least the data carrier-specific identification data is stored so that it cannot be changed.

2. The method of communication of claim 1, characterized in that the receiving signal is transmitted over a separate transmission channel to the recipient user.

3. The method of data communication of claim 1 or 2, characterized in that the informational data and/or address data, which is to be sent, is stored at one time on the chip card and, at a later time, is read from the chip card for entering the data into the host computer.

4. The method of data communication of claim 1 or 2, characterized in that the authorization data consists of an identification, which can be entered in such a manner that, before the comparison with the authorization data by the user, the identification, with which the personal identification stored in the portable data carrier is compared, is entered.

5. The method of data communication of claim 1 or 2, characterized in that the authorization data is stored in the host computer.

6. The method of data communication of claim 1 or 2, characterized in that, when sending informational data, after the identification of the sender user, which must be entered before sending, is found to be identical with personal identification stored in the memory, the permanent identification can be read from the memory as sender information of the sender user.

7. The method of data communication of claim 1 or 2, characterized in that, after agreement of an identification of the sender user, which must be entered before the sending, with the personal identification stored in the memory, the personal identification in the memory can be changed.

8. The method of data communication of claim 1 or 2, characterized in that, by means of the address data or an additional service identification, the informational data can be passed on to the recipient with the interposing of other networks.

9. The method of data communication of claim 1 or 2, characterized in that fee information, corresponding to informational data transmitted, is generated by the host computer and stored on the chip card.

10. The method of data communication of claim 1 or 2, characterized in that an accounting identification is stored on the chip card and fee information, corresponding to the informational data transmitted, is generated by the host computer and that this fee information is passed on to a computer, corresponding to the accounting identification, for further processing.

11. A data communication system with a portable data carrier, a device for acquiring and storing data on the data carrier, a data reader for reading the data carrier, a data output device, several communication devices, which are separated spatially from one another and contain at least the data reader, and a connection over a leased line, a discretionary telephone line or a data radio line to a host computer, characterized in that the data carrier consists of a chip card with a read and write nv memory and a ROM memory, on which data carrier-specific identification data, which cannot be changed, is stored and user-specific identification data, recipient-specific address data and informational data, which can be entered over the data acquisition device, can be altered and stored and in that a chip card reader is provided, which can be connected to or integrated in the data acquisition and/or output device.

12. The data communication system of claim 11, characterized in that the data communication equipment is constructed as a data acquisition and output device in such a manner, that the data acquisition device, the data reader and the data output device are integrated in one device.

13. The data communication system of claim 11 or 12, characterized in that the host computer is provided with addressable connections to other networks.

* * * * *